US006292129B1

United States Patent
Matsugatani et al.

(10) Patent No.: US 6,292,129 B1
(45) Date of Patent: *Sep. 18, 2001

(54) STRUCTURE OF RADAR SYSTEM WITH MULTI-RECEIVER CHANNEL

(75) Inventors: Kazuoki Matsugatani, Kariya; Hiroshi Hazumi, Nagoya, both of (JP)

(73) Assignee: Denso Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/538,500

(22) Filed: Mar. 30, 2000

(30) Foreign Application Priority Data

Mar. 31, 1999 (JP) .................................................. 11-092541

(51) Int. Cl.⁷ .............................. G01S 13/93; G01S 13/42
(52) U.S. Cl. .......................... 342/70; 342/107; 342/111; 342/115; 342/116; 342/192; 342/196
(58) Field of Search .................................. 342/70, 71, 72, 342/89, 107, 111, 115, 116, 128, 129, 135, 192, 194, 196

(56) References Cited

U.S. PATENT DOCUMENTS

| | | | |
|---|---|---|---|
| 4,825,214 | * | 4/1989 | Dejaegher et al. ............... 342/128 |
| 5,619,208 | * | 4/1997 | Tamatsu et al. ................. 342/70 |
| 5,757,307 | * | 5/1998 | Nakatani et al. ............... 342/70 |
| 5,905,458 | * | 5/1999 | Ashihara ........................ 342/70 |
| 6,031,483 | * | 2/2000 | Urabe et al. ................... 342/70 |
| 6,121,918 | * | 9/2000 | Tullsson ........................ 342/159 |

FOREIGN PATENT DOCUMENTS

| | | |
|---|---|---|
| 5-40168 | 2/1993 | (JP) . |
| 5-150037 | 6/1993 | (JP) . |
| 6317653 | 11/1994 | (JP) . |
| 7-5252 | 1/1995 | (JP) . |
| 8-271614 | 10/1996 | (JP) . |
| 10-63645 | 3/1998 | (JP) . |

OTHER PUBLICATIONS

"DBF Radar" edited by K. Yoshida; Revised Radar Technology: Oct. 1, 1996; pp., 289–291 (w/partial English translation).

* cited by examiner

Primary Examiner—John B. Sotomayor
(74) Attorney, Agent, or Firm—Law office of David G. Posz

(57) ABSTRACT

A radar apparatus is provided which includes a transmitter, a receiver, and a signal processor. The transmitter produces a transmit signal which is so modulated in frequency as to change with time cyclically and transmits the transmit signal as a radar wave. The receiver selectively establishes communication with one of receiving antennas and changes the communications with the receiving antennas in sequence in a cycle shorter than a cycle of a change in the frequency of the transmit signal to supply a series of signal components of input signals produced by the receiving antennas. The receiver mixes the series of signal components with a local signal having the same frequency as that of the transmit signal to produce a beat signal. The signal processor samples the beat signal to analyze frequency components thereof to determine the distance to, relative speed and azimuth of a target. These arrangements result in simplicity of the whole structure of the radar apparatus, thereby allowing radar information about the target to be obtained accurately by the compact structure.

15 Claims, 16 Drawing Sheets

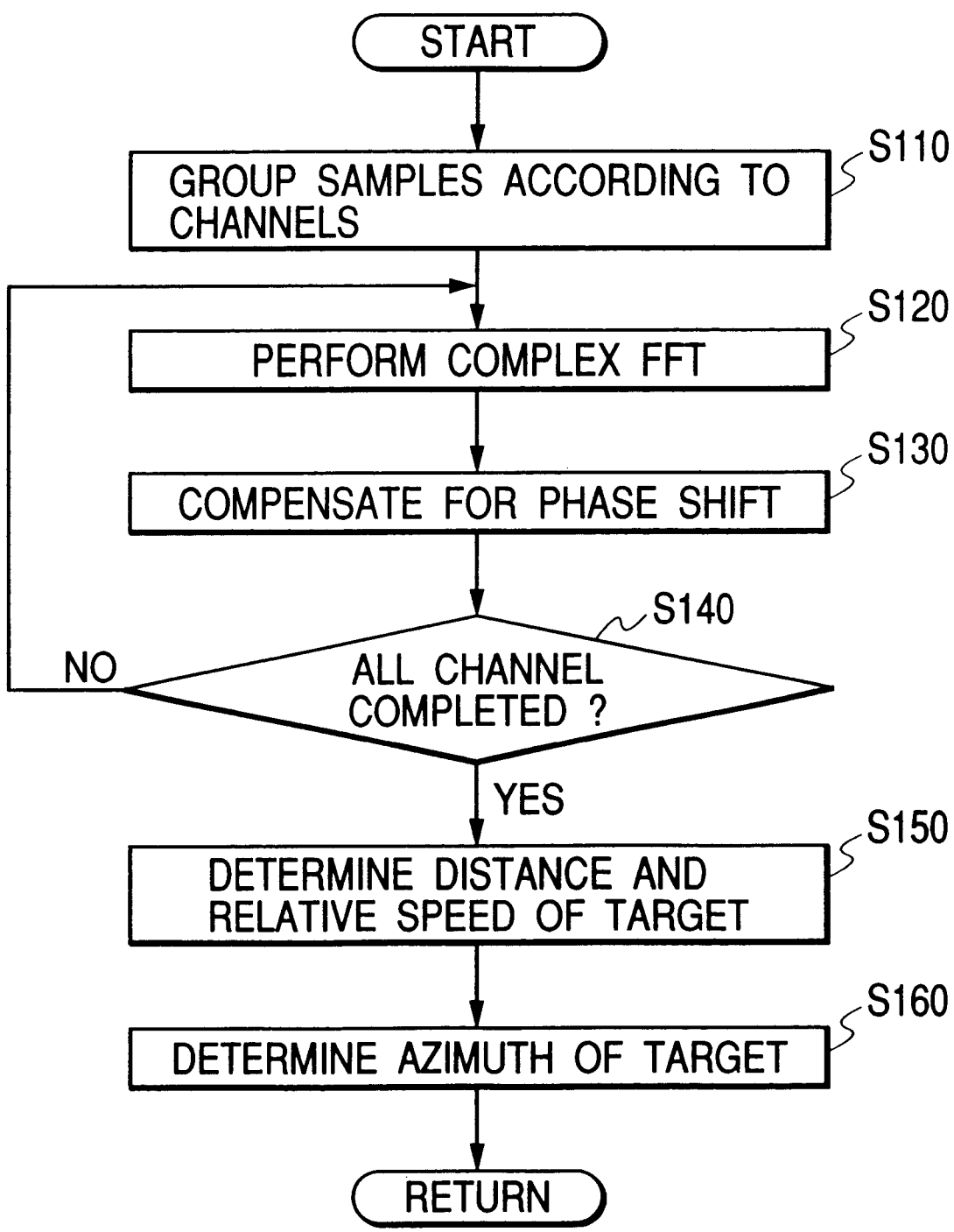

STRUCTURE OF RADAR SYSTEM WITH MULTI-RECEIVER CHANNEL

BACKGROUND OF THE INVENTION

1. Technical Field of the Invention

The present invention relates generally to a radar apparatus designed to emit a radar wave modulated in frequency in time series and receive a return of the radar wave from a target through a plurality of receiving antennas to determine at least the azimuth or angular direction of the target.

2. Background Art

Recently, a radar is tried to be used in an anti-collision device of automotive vehicles. FM-CW (frequency-modulated continuous wave) radars designed to measure both the distance to and relative speed of a target are proposed for ease of miniaturization and reduction in manufacturing cost thereof.

Typical FM-CW radars transmit a radar signal Ss, as indicated by a solid line in FIG. 17(a), which is frequency-modulated with a triangular wave to have a frequency increased and decreased cyclically in a linear fashion and receive a radar return of the transmitted radar wave from a target. The received signal Sr, as indicated by a broken line, undergoes a delay of time Td the radar signal takes to travel from the radar to the target and back, that is, time depending upon the distance to the target, so that the received signal Sr is doppler-shifted in frequency by Fd depending upon the relative speed of the target. The received signal Sr and the transmitted signal Ss are mixed together by a mixer to produce a beat signal, as shown in FIG. 17(b), whose frequency is equal to a difference in frequency between the received signal Sr and the transmitted signal Sb. If the frequency of the beat signal when the frequency of the transmitted signal Ss is increased, which will be referred to below as a beat frequency in a modulated frequency-rising range, is defined as fu, the frequency of the beat signal when the frequency of the transmitted signal Ss is decreased, which will be referred to below as a beat frequency in a modulated frequency-falling range, is defined as fd, then distance R to and relative speed V of the target may be expressed as:

$$R = \frac{c \cdot T}{8 \cdot \Delta T} \cdot (fu + fd) \quad (1)$$

$$V = \frac{c}{4 \cdot Fo} \cdot (fu - fd) \quad (2)$$

where c is the propagation speed of a radio wave, T is a cycle of the triangular wave for modulation of the transmitted signal Ss, ΔF is a variation in frequency of the transmitted signal Ss, and Fo is a central frequency of the transmitted signal Ss.

In use such an FM-CW radar in automotive vehicles, it is important to measure the azimuth or angular direction of a target as well as the distance R to and relative speed V of the target.

U.S. Pat. No. 5,369,409 to Urabe et al. teaches a FM-CW radar capable of measuring the azimuth of a target. The FM-CW radar consists of a plurality of antennas, a single transmitter, and a single receiver. The transmitter outputs a transmit signal to any one of the antennas for transmitting a radar wave. The antennas are so oriented in different directions, respectively, that beams emitted from adjacent two of the antennas may overlap with each other. The receiver receives one of signals received by the antennas to produce a beat signal. The radar switches combinations of the antennas used in transmitting the radar wave and receiving a return of the radar wave, in sequence, to obtain angular direction information about the target based on the strength of the beat signal and the location of the selected combination of the antennas.

Specifically, one or adjacent two of the antennas are selected for use both in transmitting the radar wave and receiving a return of the radar wave to detect the target within a range of the beam or a range where the beams overlap with each other. If the target is detected in a plurality of ranges, the angular direction of the target is determined based on strengths of signals received in the ranges.

The above conventional radar, however, has the drawback in that the switching of the combinations of the antennas to be used simultaneously is made every cycle of a change in frequency of the transmit signal, so that the azimuth of the target cannot be determined until the switching of all the combination is completed, thus requiring a long time until subsequent detection for updating the information about the target.

It is known that the strength of the beat signals are usually sensitive to various factors, and the resolution in range of the radar may be improved more greatly by measuring the azimuth using the phases of the beat signals than using the strength thereof. The above conventional radar, however, does not receive a return of the radar wave through a plurality of antennas simultaneously, and it is impossible to measure the azimuth of the target using the phases of the beat signals.

There is known a digital beam forming (DBF) technique for measuring the azimuth of a target using the phases of beat signals. The DBF is to form antenna patterns in the form of digital beams produced from a return of a radar wave received by a plurality of antennas simultaneously. Specifically, the DBF is equivalent to digitally performing functions of analog phase shifters installed in each radiating element in a conventional phased array system and of combining outputs of the analog phase shifters in an analog form.

The use of the DBF technique enables the strength of phase of beat signals to be measured in units of target angular directions each specified by one of the beams, thereby resulting in improved accuracy in measuring the azimuth of the target. The DBF technique has also the advantage that delaying each received signal is achieved in a phase shifter easily by software, thereby allowing a plurality of beam patterns to be formed simultaneously only by measuring signals received through the antennas for one cycle of changes in frequency of the transmit signal.

The realization of high accuracy measurement of the azimuth of a target using the DBF technique requires, as discussed above, simultaneous reception of a return of the same radar wave. This requires, as disclosed in Japanese Patent First Publication No. 5-150037, a plurality of expensive high-frequency receivers one for each antenna, thus resulting in increases in manufacturing cost and size of the system.

SUMMARY OF THE INVENTION

It is therefore a principal object of the present invention to avoid the disadvantages of the prior art.

It is another object of the present invention to provide a compact structure of a radar apparatus capable of obtaining at least angular direction information about a target within a decreased time with high accuracy.

According to the first aspect of the invention, there is provided a radar apparatus which comprises: (a) a transmitter producing a transmit signal which is so modulated in frequency as to change with time cyclically and transmitting the transmit signal as a radar wave; (b) a plurality of receiving antennas each receiving a return of the radar wave from an object present in a radar detectable zone to produce an input signal; (c) a receiver including a receiver switch, a switching control circuit, and a receiving circuit; and (d) a signal processor sampling a beat signal produced by the receiver to analyze frequency components of the beat signal. The receiver switch selectively establishes communication between one of the receiving antennas and the receiving circuit. The switching control circuit controls an operation of the receiver switch so as to change the communications between the receiving antennas and the receiving circuit in sequence in a cycle shorter than a cycle of a change in the frequency of the transmit signal to supply a series of signal components of the input signals produced by the receiving antennas to the receiving circuit. The receiving circuit mixes the series of signal components with a local signal having the same frequency as that of the transmit signal to produce the beat signal.

In the preferred mode of the invention, each of the receiving antennas has directivity that causes a return of the radar wave traveling from any angular direction over a beam range of the radar wave to be received.

The receiving antennas are arrayed in line.

The center-to-center interval dw of adjacent two of the receiving antennas is so set as to satisfy an equation below $$dw \leq \lambda / \{2 \sin (\phi/2)\}$$

where $\lambda$ is the mean wavelength of the transmit signal, and $\phi$ is a beam width of the radar wave emitted from the transmitter.

Each time the receiver switch selectively establishes the communications between all the receiving antennas and the receiving circuit one time for each of the receiving antennas, the switching control circuit changes the order of establishing the communications.

The signal processor includes, (1) beat signal reproducing means for reproducing as many second beat signals as the receiving antennas each of which is made up of the signal components of a corresponding one of the input signals, (2) distance information determining means for determining information about a distance to the object by performing frequency analysis of each of the second beat signals to determine a signal strength and phase of each of resultant frequency components to determine the information based on the signal strengths, and (3) angular direction information determining means for determining information about an angular direction of the object by comparing between the phases of ones of the frequency components, determined by the distance information determining means, which have the same frequency.

The beat signal reproducing means includes sampling means for sampling the beat signal supplied from the receiving circuit in synchronism with the operation of the receiver switch and grouping means for grouping samplings according to the input signals to produce the second beat signals.

The beat signal reproducing means may alternatively include a splitting switch which splits the beat signal supplied from the receiving circuit in synchronism with the operation of the receiver switch into as many signals as the receiving antennas each of which includes one of the input signals produced by the receiving antennas to produce the second beat signals and sampling means for sampling the second beat signals to analyze frequency components thereof.

The beat signal reproducing means may also include as many low-pass filters as the split signals whose cutoff frequency is lower than a switching frequency of the splitting switch and which remove harmonic components from the split signals caused by an operation of the splitting switch. The sampling means samples outputs from the low-pass filter for analyze frequency components thereof.

A phase compensating means may further be provided for compensating for a shift in the phase $\theta i(fb)$ of each of the frequency components having a frequency $fb$ determined by the distance information determining means, caused by differences in time when the receiving antennas are selected by the receiver switch, by multiplying the phase $\theta i(fb)$ by a compensating coefficient H1 given by an equation below $$H1 = \exp\{-j \cdot 2\pi \cdot fb \cdot (ti - t1)\}$$

where j is an imaginary unit, i is one of numbers (=1,2, . . . , n) assigned to the receiving antennas, respectively, and ti is a time when one of the receiving antennas to which the number i is assigned is selected by the receiver switch.

The angular direction information determining means determines the information about the angular direction of the object using the phases compensated for by the phase compensating means.

The phase compensating means may further compensate for a shift in the phase $\theta i(fb)$ caused by differences in path from the receiving antennas to the receiving circuit by multiplying a product of the phase $\theta i(fb)$ and the compensating coefficient H1 by a second compensating coefficient H2 given by an equation below $$H2 = \exp\{-j \cdot \delta i\}$$

where $\delta i$ is a phase delay of the input signal, produced by one of the receiving antennas to which the number i is assigned, between the one of the receiving antennas and the receiving circuit.

The frequency analysis in the distance information determining means and the comparing between the phases in the angular direction information determining means are performed using a complex Fourier Transform.

The receiving antennas are arrayed in line and connected to the receiving circuit so that propagation losses of the input signals produced by ones of the receiving antennas located closer to the center of the array of the receiving antenna may be smaller.

The transmitter may include (1) a transmitting circuit producing the transmit signal, (2) a plurality of transmitting antennas which convert the transmit signal into radar waves and emit the radar waves in different directions, (3) a transmitter switch selectively establishing communication between one of the transmitting antennas and the transmitting circuit to supply the transmit signal to the one of the transmitting antennas, and (4) a switching control circuit changing the communications between the transmitting antennas and the transmitting circuit every cycle of the change in the frequency of the transmit signal.

According to the second aspect of the invention, there is provided a radar apparatus which comprises: (a) a transmitter producing a transmit signal which is so modulated in frequency as to change with time cyclically and transmitting the transmit signal as a radar wave; (b) a plurality of antenna groups each consisting of a plurality of antennas each receiving a return of the radar wave from an object present in a radar detectable zone to produce an input signal; (c) a receiver including receiver switches, a switching control circuit, and receiving circuits; and (d) a signal processor sampling a beat signals produced by the receiver to analyze frequency components of the beat signals. Each of the receiver switches selectively establishes communication between one of the receiving antennas in one of the antenna groups and one of the receiving circuits. The switching control circuit controls operations of the receiver switches so as to change the communications between the receiving antennas and the receiving circuits in sequence in a cycle shorter than a cycle of a change in the frequency of the transmit signal to supply a plurality of series of signal components of the input signals each of which is produced by the receiving antennas in a corresponding one of the antenna groups to the receiving circuit. Each of the receiving circuits mixes a corresponding one of the series of signal components with a local signal having the same frequency as that of the transmit signal to produce the beat signal.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 5 is a flowchart of a program performed by a signal processor of the first embodiment to determine distance to, relative speed and angular direction of a target;

DESCRIPTION OF THE PREFERRED EMBODIMENTS

Figure 1:
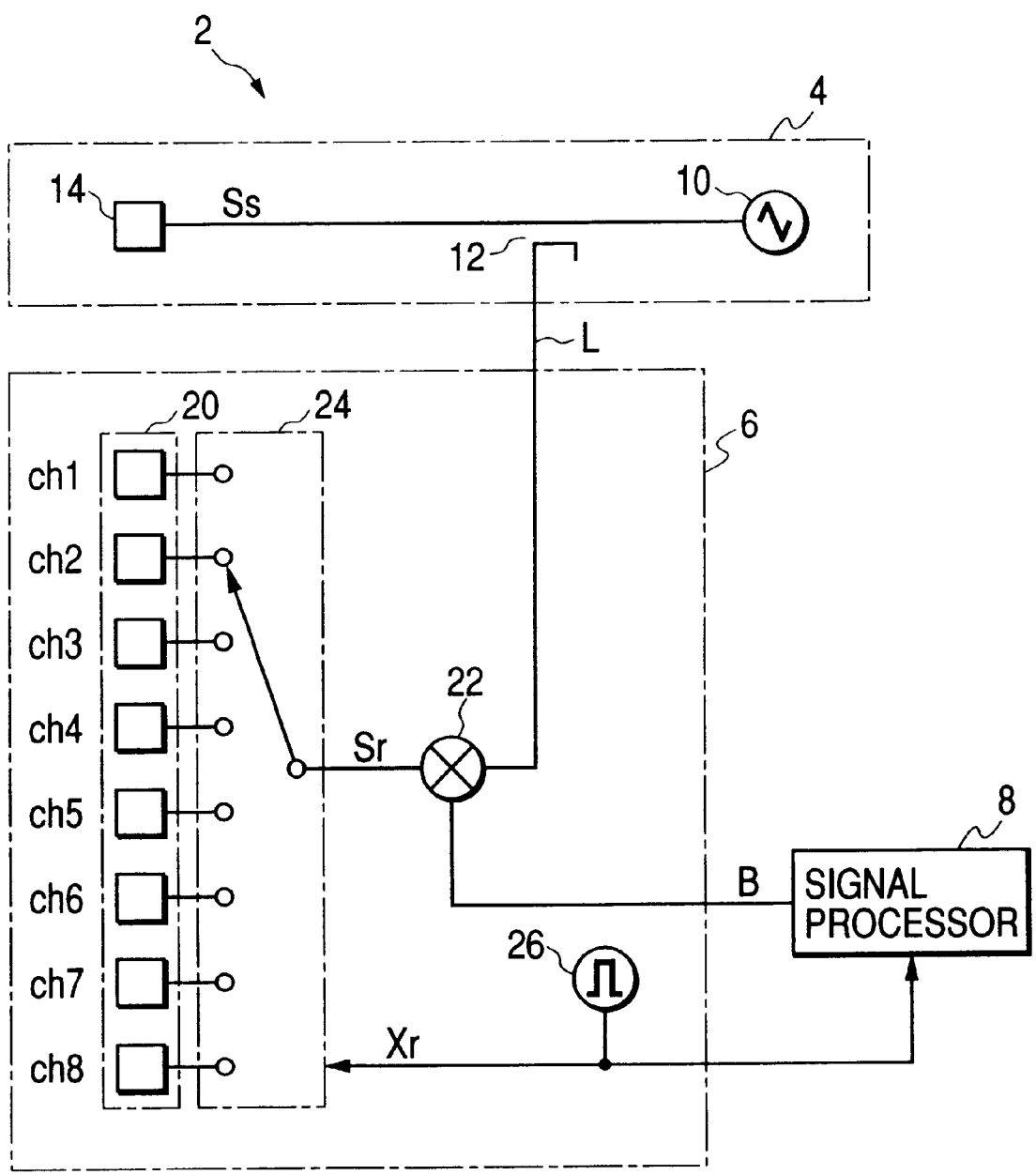
FIG. 1 is a block diagram which shows a radar apparatus according to the present invention.

Referring now to the drawings, particularly to FIG. 1, there is shown a radar apparatus 2 according to the first embodiment of the invention which may be employed in automotive anti-collision system or automotive radar cruise control system to detect the presence of obstacles in front of a vehicle.

The radar apparatus 2 generally includes a transmitter 4, a receiver 6, and a signal processor 8. The transmitter 4 transmits a radar wave in the form of a millimeter wave. The receiver 6 receives a return of the radar wave from an object such as a preceding vehicle or a roadside obstacle present in a radar detectable zone to produce beat signals, as will be described later in detail. The signal processor 8 determines the distance to, relative speed, and azimuth or angular direction of the object using the beat signals.

The transmitter 4 consists of a transmitting circuit 10, a distributor 12, and a transmitting antenna 14. The transmitting circuit 10 has a high frequency oscillator which produces a high frequency signal in a millimeter wave band which is so modulated that the frequency thereof is increased and decreased cyclically. The distributor 12 splits in power the high frequency signal produced by the transmitting circuit into a transmit signal Ss and a local signal L. The transmit signal Ss is radiated from the transmitting antenna 14 as a radar wave. The local signal L is supplied to the receiver 6.

Figures 17A, 17B:
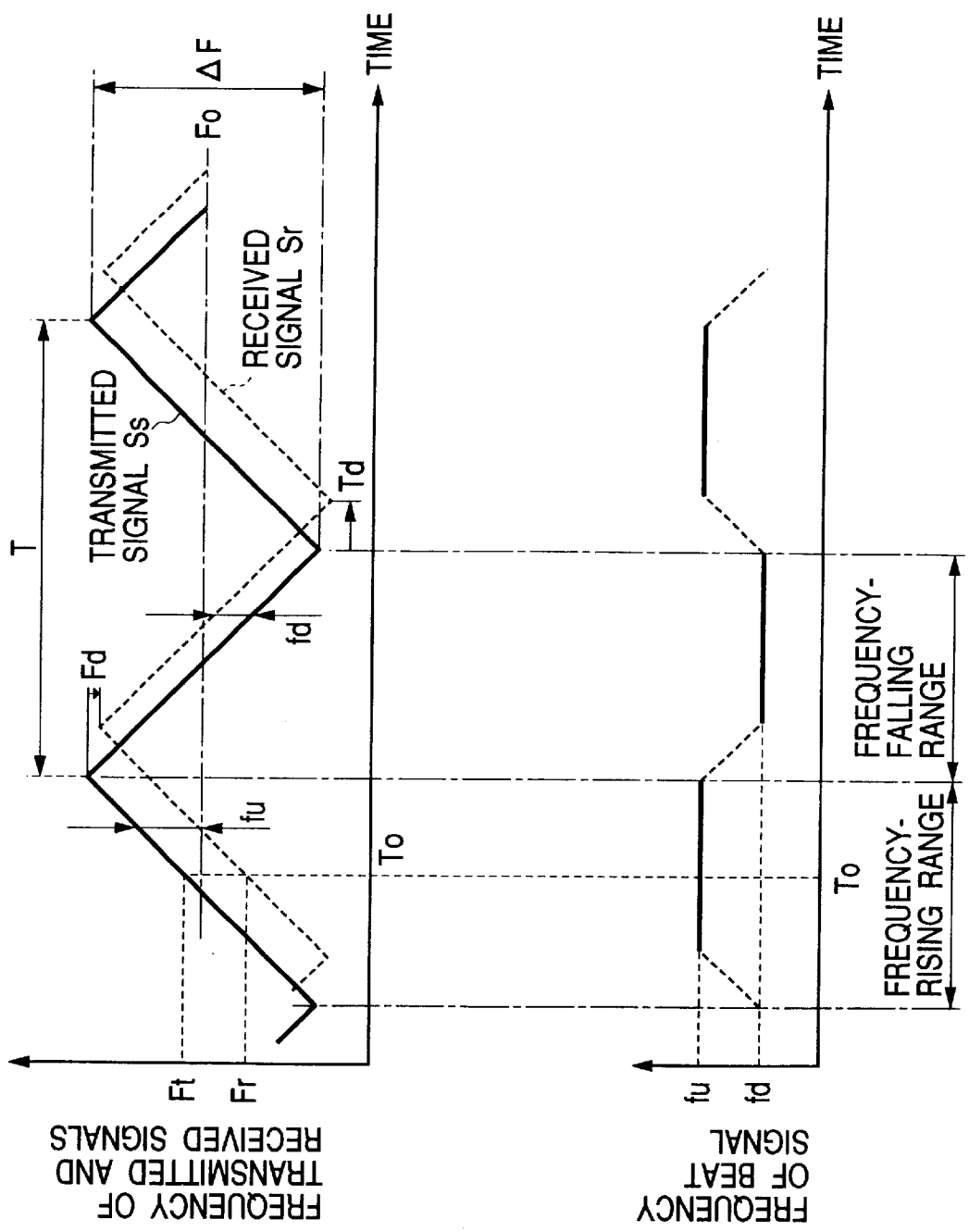
FIG. 17(a) shows the waveforms of a transmitted and received signals in an FM-CW radar.
FIG. 17(b) shows the waveform of a beat signal in an FM-CW radar.

The frequency of the transmit signal Ss produced by the transmitting circuit changes in the form of a triangular wave, as indicated by the solid line in FIG. 17(a), whose central frequency Fo=76.5 GHz, frequency change ΔF=100 MHz, and cycle T=1.024 ms. The beam width of the radar wave emitted from the transmitting antenna 14 is so set that it may cover the whole of a radar detectable zone.

The receiver 6 consists of eight receiving antennas arrayed in line, a receiving circuit 22, a switch 24, and a switch driver 26. Each of the receiving antennas receives a return of the radar wave emitted from the transmitting antenna 14 to produce an input signal Sr which will also be referred to as the received signal Sr below. The receiving circuit 22 has a high-frequency mixer which mixes the input signal Sr produced by one of the antennas with the local signal L from the distributor 12 to produce the beat signal B whose a frequency component equivalent to a difference in frequency between the received signal Sr and the local signal L. The switch 24 is responsive to the selection signal Xr inputted from the switch driver 26 to establish communication between one of the antennas 20 and the receiving circuit 22 to select one of the received signals Sr.

The receiver 6 has eight receiver channels ch1 to ch8 each including one of the antennas 20. All the receiver channels ch1 to ch8 use the single receiving circuit 22 through time sharing.

Figure 2:
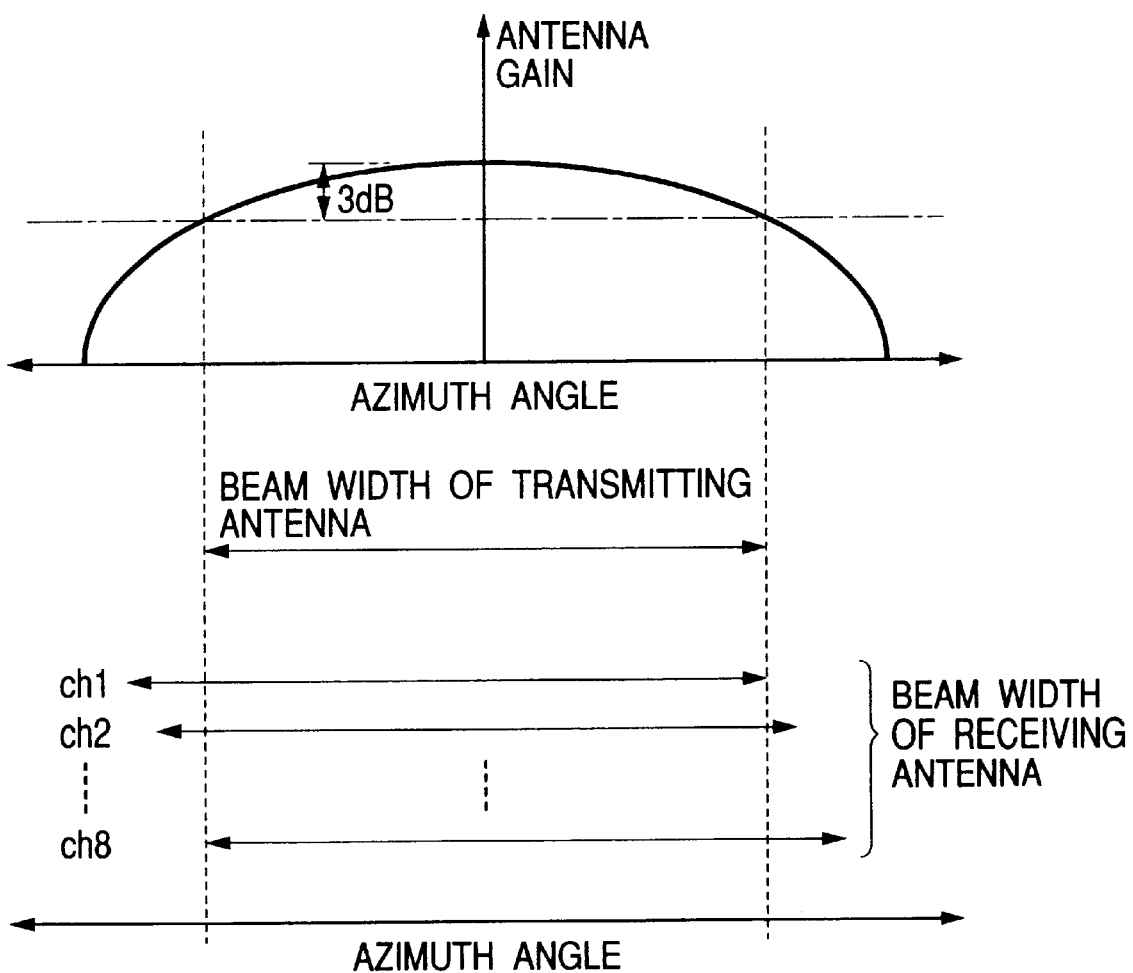
FIG. 2 is an illustration which shows a relation in beam width between a transmitting antenna and receiving antennas.

If an angular range, as shown in FIG. 2, in which a decrease in gain of a beam formed by an antenna from the central direction is within 3 dB is defined as the beam width, each of the receiving antennas is so designed that the beam width thereof may cover the whole of the beam width (=20° in this embodiment) of the transmitting antenna 14. Specifically, each of the receiving antennas has the directivity that causes a return of the radar wave traveling from any angular direction over a beam range of the radar wave to be received, thereby allowing a digital beam forming (DBF) technique to be used in phase comparison, as will be discussed later, when information about the azimuth of a target is obtained.

The center-to-center interval dw between adjacent two of the antennas 20 is so determined as to meet an equation below for measuring the azimuth of any target objects present over a range of a beam emitted from the transmitting antenna 14 correctly.

$$dw \leq \frac{\lambda}{2\sin(\phi/2)} \qquad (3)$$

where $\phi$ is the beam width of a radar wave emitted from the transmitter 4, and $\lambda$ is the mean wavelength of the transmit signal Ss.

The above equation is determined in the following manner. From Eq. (8), as will be described later, the center-to-center interval dw is $$dw = \frac{\zeta \cdot \lambda}{2\pi \sin\alpha} \qquad (4)$$

The phase difference $\zeta$ which can be determined by the phase comparison is within a range of $-\pi < \zeta < \pi$. The angular range $\alpha$ in which the radar wave having the beam width $\phi$ can detect an object is $-\phi/2 < \alpha < \phi/2$. Thus, substituting $\zeta = \pi$ and $\alpha = \phi/2$ into Eq. (4), we obtain $$dw = \frac{\lambda}{2\sin(\phi/2)} \qquad (5)$$

In practice, it is advisable that the center-to-center interval dw be determined so that a target can be detected within a range wider than the beam width. Thus, the center-to-center interval dw satisfying Eq. (3) enables desired information about the azimuth of a target to be obtained.

In this embodiment, the mean wavelength $\lambda$ of the transmit signal Ss is c/Fo=3.92 mm where c is the light velocity. Thus, the value of the right side of the above equation will be 11.3 mm. The center-to-center interval dw in this embodiment is set to 8 mm which is smaller than 11.3 mm.

Figure 3:
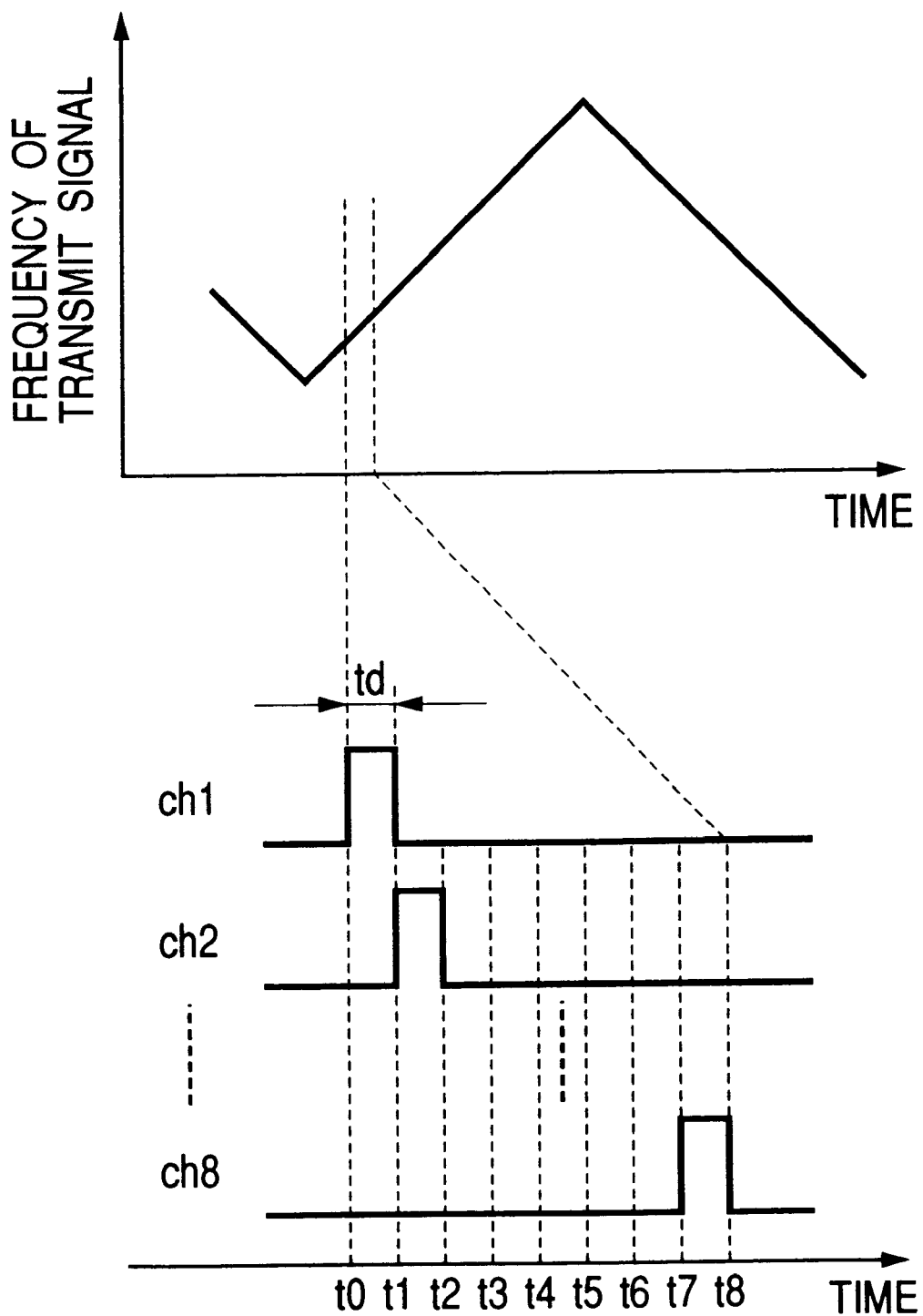
FIG. 3 is an illustration which shows switching times of a receiver switch.

The switch driver 26 outputs the selection signals Xr to the switch 24 so that communications of the antennas with the receiving circuit 22 may be changed, in sequence, as shown in FIG. 3, in the order of the receiver channels ch1, ch2, ch3, . . . , ch8. The selection signals Xr are also outputted to the signal processor 8.

The signal processor 8 includes a typical microcomputer consisting of a CPU, a ROM, and a RAM, an A/D converter, and an arithmetic processing unit. The A/D converter operates in synchronism with inputs of the selection signals Xr to sample the beat signal inputted from the receiver 6 to produce digital beat signals. The arithmetic processing unit performs an operation of Fast Fourier Transform (FFT) on the digital beat signals.

Figure 4A:
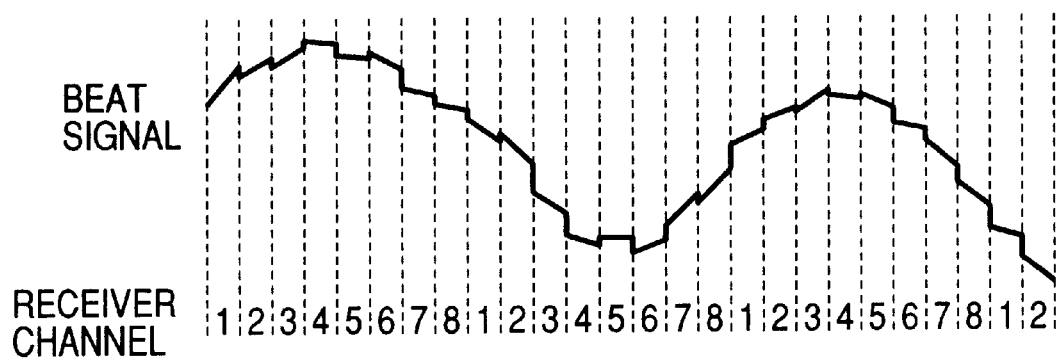
FIG. 4(a) shows a beat signal inputted to a signal processor.

The switch 24, as described above, selects each of the receiver channels chi in response to input of one of the selection signals Xr, thereby causing the received signals Sr in all the receiver channels ch1 to ch8 to be inputted to the receiving circuit 22 in a time-division multiplexing form. Thus, the receiving circuit 22 produces, as shown in FIG. 4(a), the beat signal B formed by a series of beat signal components B1 to B8 produced, in time sequence, by the received signals Sr at the receiver channels ch1 to ch8.

The period of time td for which the switch 24 holds the communication between each of the receiving antennas and the receiving circuit 22 is constant (0.25 μs in this embodiment). The switching cycle Tx in which all the receiver channels ch1 to ch8 are sequentially selected one time by the switch 24 is, thus, Tx=8×td (=2 μs). The signal processor 8 samples the beat signal components B1 to B8 produced in all the receiver channels ch1 to ch8 T/Tx times (=512) in each cycle T of the transmit signal Ss at intervals of Td.

FIG. 5 shows a flowchart of a program performed by the signal processor 8 to obtaining radar information about a target present in the radar detectable zone. This program is executed each time the data sampled by the signal processor 8 (i.e., the beat signal components B1 to B8) for one cycle T of the transmit signal Ss are all stored in a memory of the signal processor 8.

After entering the program, the routine proceeds to step 110 wherein the sampled data stored in the memory are grouped according to the receiver channels ch1 to ch8.

The routine proceeds to step 120 wherein a complex Fourier Transform (e.g., the complex Fast Fourier Transform FFT) is performed on a first one of the groups made up of the sampled data in the first receiver channel ch1 to analyze the frequency thereof. Specifically, an operation of the complex Fourier Transform is performed on each of the first half of the sampled data (i.e., the data sampled in the modulated frequency-rising range) and the second half (i.e., the data sampled in the modulated frequency-falling range), thereby determining the signal strength and phase of each frequency component.

The routine proceeds to step 130 wherein one of the frequency components showing the peak of the signal strength is extracted, and the phase θi(fb) of the extracted frequency component (frequency fb) is corrected using an equation below to derive the phase θhi(fb). Note that i indicates one of the channels chi (ch1 to ch8).

$$\theta hi(fb) = \theta i(fb) \cdot H1 \cdot H2 \qquad (6)$$

where $$H1 = \exp\{-j \cdot 2\pi \cdot fb \cdot (i-1) \cdot td\}$$

$$H2 = \exp\{-j \cdot \delta i\}$$

where (i−1)·td is the elapsed time ti−t1 between time t1 when the receiver channel ch1 is selected by the switch 24 and time ti when the receiver channel chi is selected by the switch 24, δi is a phase lag of the received signal Sr pre-measured between each of the receiving antennas 20 and the receiving circuit 22 at a corresponding one of the receiver channels chi, and j is an imaginary unit.

Figure 16A:
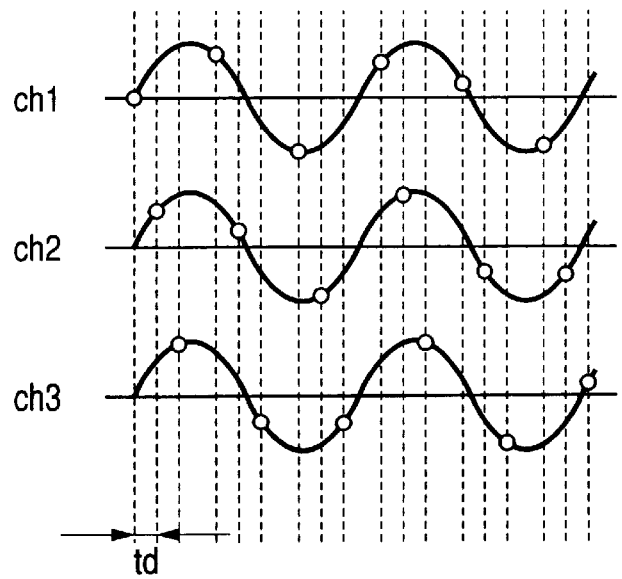
FIG. 16(a) shows a relation in phase among signals outputted from a receiver switch.
Figure 16B:
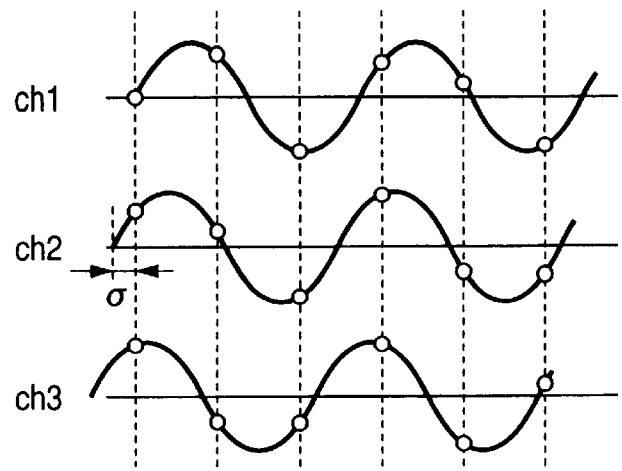
FIG. 16(b) shows a phase shift between two adjacent signals outputted from a receiver switch.

Specifically, if a phase shift σ occurs, as shown in FIG. 16(b), between the beat signals in adjacent two of the receiver channels, it may be expressed as $$\sigma = 2\pi \cdot fb \cdot td \qquad (7)$$

where fb is the frequency of the beat signal, and td=ti−t1.

Therefore, a phase shift of the beat signal caused by sequential operations of the switch 24 may be compensated for by multiplexing the phase of the beat signal by exp(−j·σ) (i.e., H1).

Further, an additional phase shift (i.e., the phase lag δi) caused by differences in path from the receiving antennas 20 to the receiving circuit 22 usually occurs between the beat signals. Thus, the phase lag δi may also be compensated for by multiplexing a product of θi(fb) and H1 by exp{−j·δi} (i.e., H2).

The routine proceeds to step 140 wherein it is determined whether the operations in steps 120 and 130 have been performed on the data sampled in all the receiver channels ch1 to ch8 or not. If a NO answer is obtained, then the routine returns back to step 120 wherein the sampled data in the subsequent group is analyzed through the complex Fourier Transform. Alternatively, if a YES answer is obtained, then the routine proceeds to step 150. In step 15, the signal strengths of the frequency components derived in step 120 are analyzed to extract ones showing the peaks in the modulated frequency-rising and -falling ranges (i.e., the frequencies fu and fd). Next, the distance R to and relative speed V of the target are determined according to Eqs. (1) and (2), as discussed in the introductory part of this application. If a plurality of peaks are detected in either of the modulated frequency-rising and-falling ranges, ones of the frequency components having almost the same signal strength may be paired to determine the distance R to and relative speed V of the target using each of the pairs. This paring technique is disclosed, for example, in U.S. application Ser. No. 09/390,316 assigned to the same assignee as that of this application, disclosure of which is incorporated herein by reference.

The routine proceeds to step 160 wherein the corrected phases θhi(fb) derived in step 130 are compared among the receiver channels ch1 to ch8 to determine the azimuth α of the target in the following manner.

Figure 15:
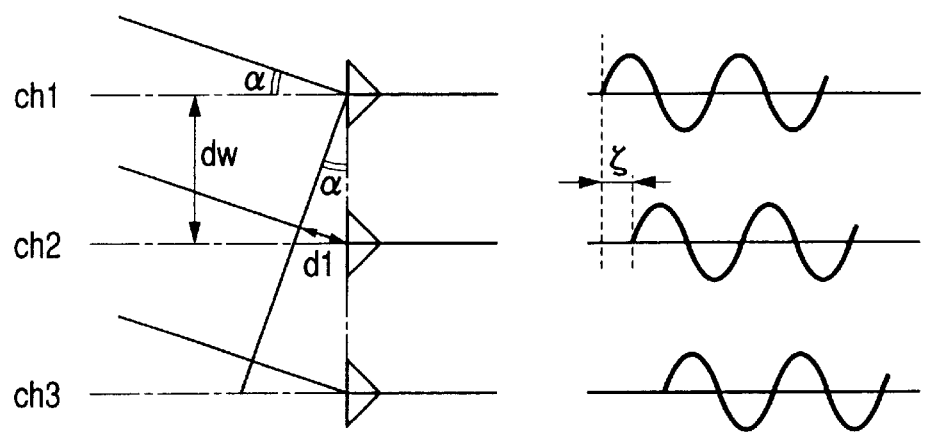
FIG. 15 shows the principle of measuring the angular direction of a target using the phases of signals produced by an array of antennas.

FIG. 15 shows the principle of measuring the azimuth of a target using the phases of signals produced by an array of antennas. In the shown case, the center-to-center interval between adjacent two of the antennas is dw, and a return of a radar wave enters each of the antennas at an angle of a to a line extending perpendicular to the plane of the antennas. In general, returns of a radar wave from an object located at least several meters away from may be viewed as entering the antennas in parallel to each other. Thus, an optical path difference d1 (=dw·sin α) occurs between the radar returns entering adjacent two of the antennas in receiver channels ch1 and ch2 or ch2 and ch3. The optical path difference d1 will cause signals produced in the receiver channels ch1 and ch2 or ch2 and ch3 to have a phase difference which, in turn, appears as a phase difference between beat signals produced in the receiver channels ch1 and ch2 or ch2 and ch3. In an FM-CW radar, a phase difference ξ between beat signals caused by the optical path difference d1 may be expressed as $$\xi = \frac{2\pi \cdot d1}{\lambda} \quad (8)$$

Expressing the optical path difference d1 by the center-to-center interval dw between the antennas and the incident angle α of the radar return in the above equation, the azimuth of the target (i.e., the incident angle α) is given by the following equation.

$$\alpha = \sin^{-1}\left(\frac{\xi \cdot \lambda}{2\pi \cdot dw}\right) \quad (9)$$

As apparent from the above discussion, in the radar apparatus 2 of this embodiment, the received signals Sr in the receiver channels ch1 to ch8 are supplied to the receiving circuit 22 through the switch 24 in the time-division multiplexing form. The signal processor 8 samples the time-division-multiplexed beat signal outputted from the receiving circuit 22 cyclically and groups the samples according to the receiver channels ch1 to ch8 for the frequency analysis. Specifically, all the receiver channels ch1 to ch8 uses the single receiving circuit 22 in the time sharing form, which eliminates the need for many expensive receiving circuits.

The eight receiver channels ch1 to ch8 are switched at a short interval (0.25 μs), so that a series of eight signal components may be viewed as being inputted to the receiving circuit 22 simultaneously. This allows the azimuth of a target to be determined based on the phases of the beat signals produced in the receiver channels ch1 to ch8, which results in improved accuracy in measuring the azimuth as compared with when using only the signal strength.

Further, shifts or delays in phase of the beat signals in the receiver channels ch1 to ch8 caused by time differences in sampling the beat signals and differences in length of signal paths of the receiver channels ch1 to ch8 between the receiving antennas and the receiving circuit 22 are compensated for, so that the azimuth of the target can be determined with high accuracy.

Figure 6:
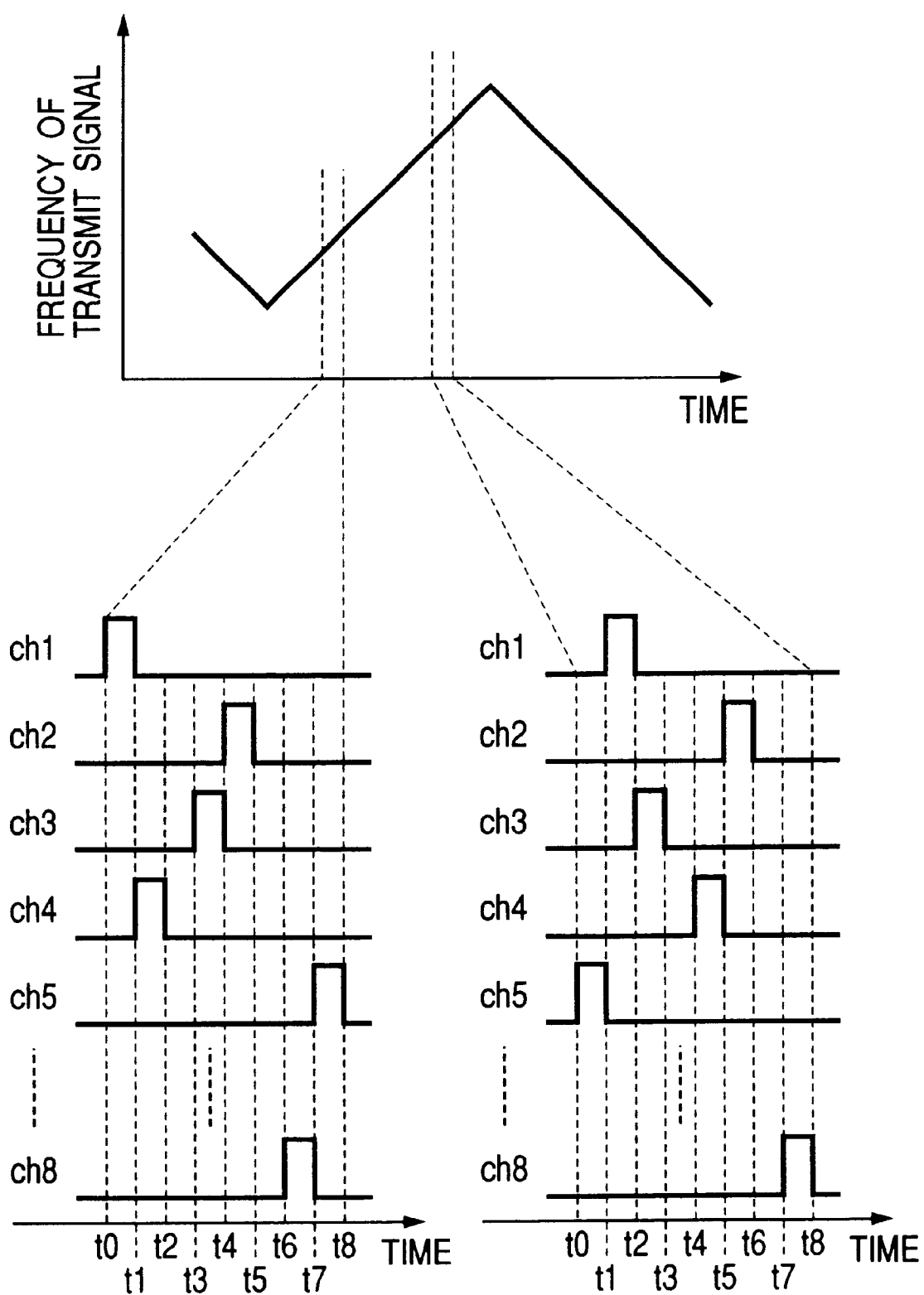
FIG. 6 shows switching times of a receiver switch in a modified form.

In this embodiment, the receiver channels ch1 to ch8 are, as described above, selected in the order of arrangement of the receiving antennas 20, however, they may alternatively be selected in random order every cycle Tx. For instance, as shown in FIG. 6, in any one of the cycles Tx, the receiver channels ch1 to ch8 may be switched in the order of 1→4→6→3→2→7→8→5, while in another cycle Tx, they may be switched in the order of 5→1→3→4→2→7→6→8. This prevents constant differences in phase of the received signals Sr caused by the order of switching the receiver channels ch1 to ch8 from occurring in the receiver channels ch1 to ch8, thereby allowing an error in measuring the azimuth of a target caused by the switching order to be controlled, which eliminates the need for the coefficient H1 to be used in correcting the phase in step 130 of FIG. 5.

Specifically, when a target is located directly in front of the receiving antennas 20, the beat signals produced in the receiver channels chi have the same phase. Conversely, when phase shifts between the beat signals in all the receiver channels chi are zero (0), the signal processor 8 may decide that the target exists just opposite the radar apparatus 2. However, when the receiving antennas 20 are switched by the switch 24, it will cause, as shown in FIG. 16(a), beat signals shifted in phase by a hold time td for which the connection of each of the receiving antennas 20 to the receiving circuit 22 is held by the switch 24 to be sampled by the signal processor 8. When the phases of the samples are compared using a typical signal processing method handling discrete data, ones of the samples closest in time to each other are usually considered as having being sampled simultaneously. However, if the receiving antennas 20 continue to be switched at regular intervals in the same order, it will cause the beat signals in adjacent two of the receiver channels chi to be considered by the signal processor 8 as having the same phase shift σ, as shown in FIG. 16(b). This causes the signal processor 8 to decide in error that the target which is, in fact, present directly opposite the radar apparatus 2 is located in an angular direction α corresponding to the phase shift σ relative to the frontal direction. Such constant phase shifts may, therefore, be minimized by changing the order of switching the receiving antennas 20 every switching cycle in which all the receiving antennas 20 are selected one time.

The beam width of a radar wave emitted from the transmitting antenna 14 is, as described above, 20°, however, it is not limited to such an angle. For example, if the center-to-center interval dw of adjacent two of the receiving antennas 20 is 8 mm, it enables, as can be seen from Eq. (9), the receiving antennas 20 to receive a signal in a maximum angular range of 28.4° (±14.2°). Therefore, in this case, widening the radar detectable zone up to 28.4° may be achieved only by increasing the beam width of the radar wave emitted from the transmitting antenna 14.

Figure 7:
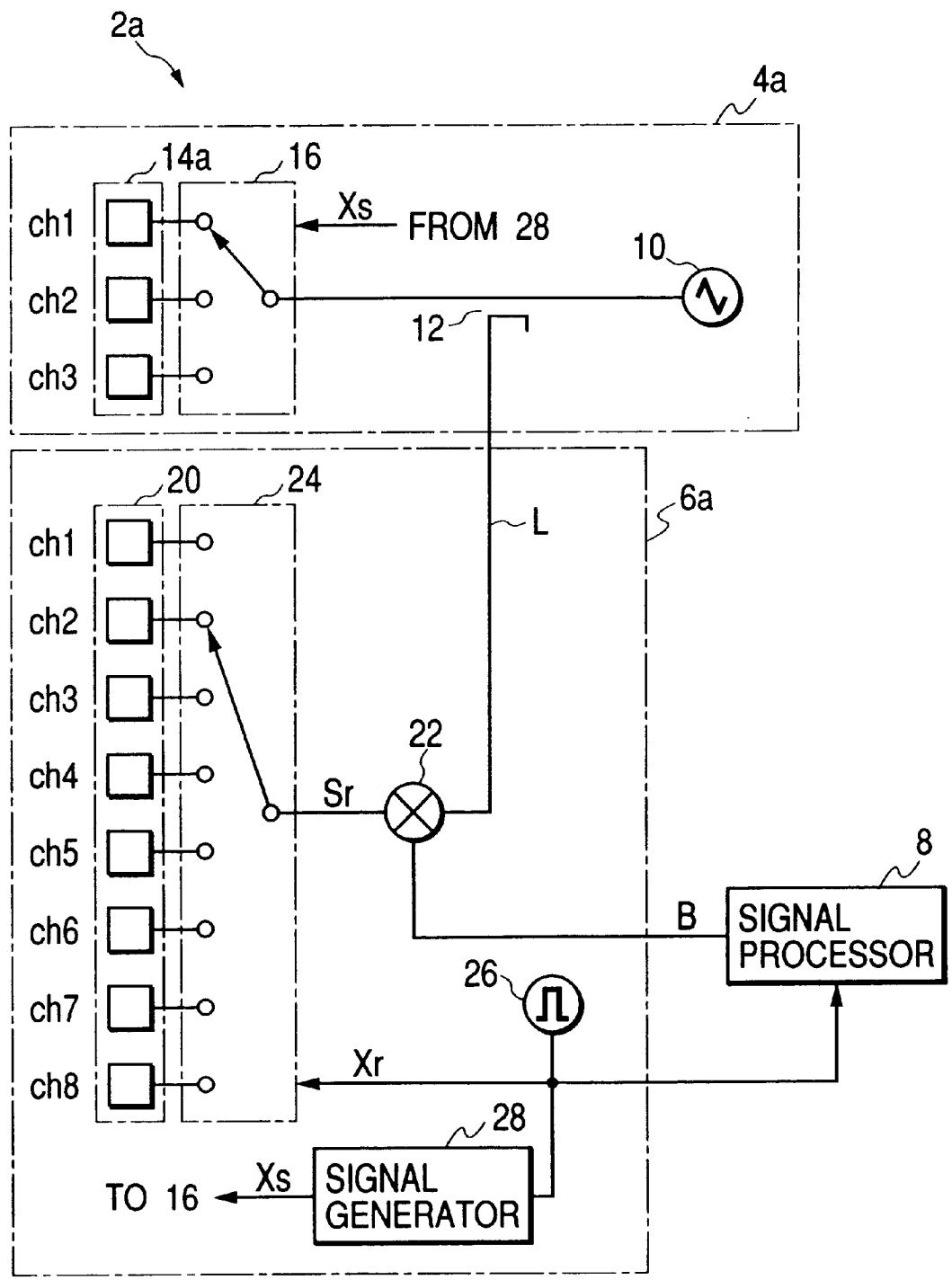
FIG. 7 is a block diagram which shows a radar apparatus according to the second embodiment of the invention.

FIG. 7 shows a radar apparatus 2a of the second embodiment. The same reference numbers as employed in the first embodiment refer to the same parts, and explanation thereof in detail will be omitted here.

The transmitter 4a includes a plurality of transmitting antennas 14a (three in this embodiment) and a switch 16 selectively establishing communication between one of the transmitting antennas 14a and the signal transmitting circuit in response to input of a selection signal Xs. Specifically, the transmitter 4a has three transmitter channels ch1, ch2, and ch3.

The receiver 6a includes a signal generator 28 which outputs the selection signals Xs in sequence to the switch 16 so that the switch 16 may establish the communication between each of the transmitting antennas 14a and the transmitting circuit one time every cycle in which the switch 24 switches between the antennas a given number of times (512×8 in this embodiment) corresponding to the cycle T of the transmit signal Ss.

Figure 8:
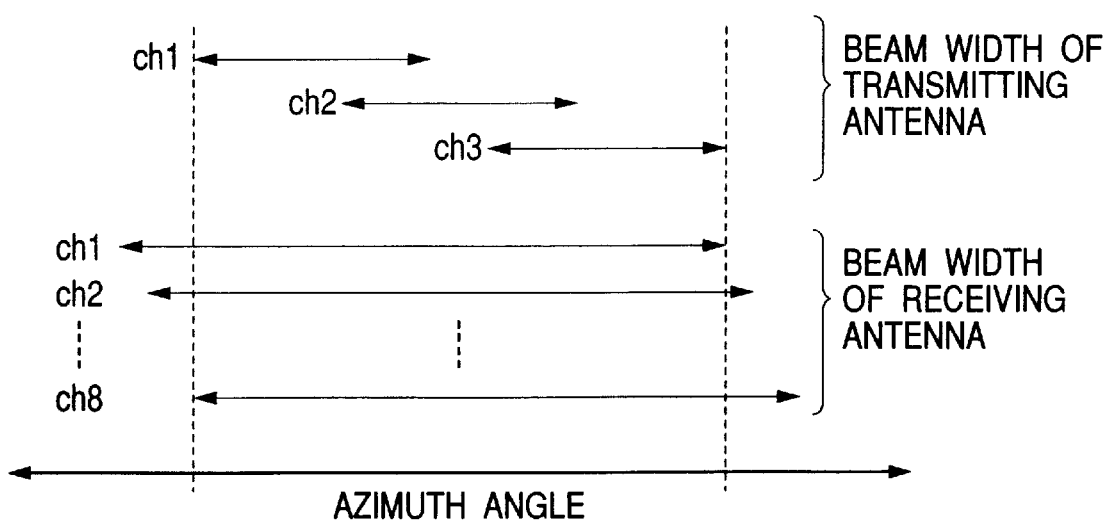
FIG. 8 is an illustration which shows a relation in beam width between a transmitting antenna and receiving antennas in the second embodiment.

The transmitting antennas 14a in the transmitter channels ch1 to ch3 are, as shown in FIG. 8, so arranged as to emit beams in different angular directions so that the beams emitted from adjacent two of the transmitting antennas 14a may overlap partially with each other. Each of the receiving antennas 20 is so designed that the beam width of a beam formed thereby may cover the whole of the beam width (=20° in this embodiment) of a composite beam formed by the three transmitting antennas 14a. This enables the radar apparatus 4a to detect an object within a range wider than that of the first embodiment in which the single transmitting antenna 14 is used.

Narrowing the beam emitted from each of the transmitting antennas 14a to decrease the beam width of the composite beam formed by the three transmitting antennas 14a allows the radar detectable distance to be increased as compared with the first embodiment.

Figure 9:
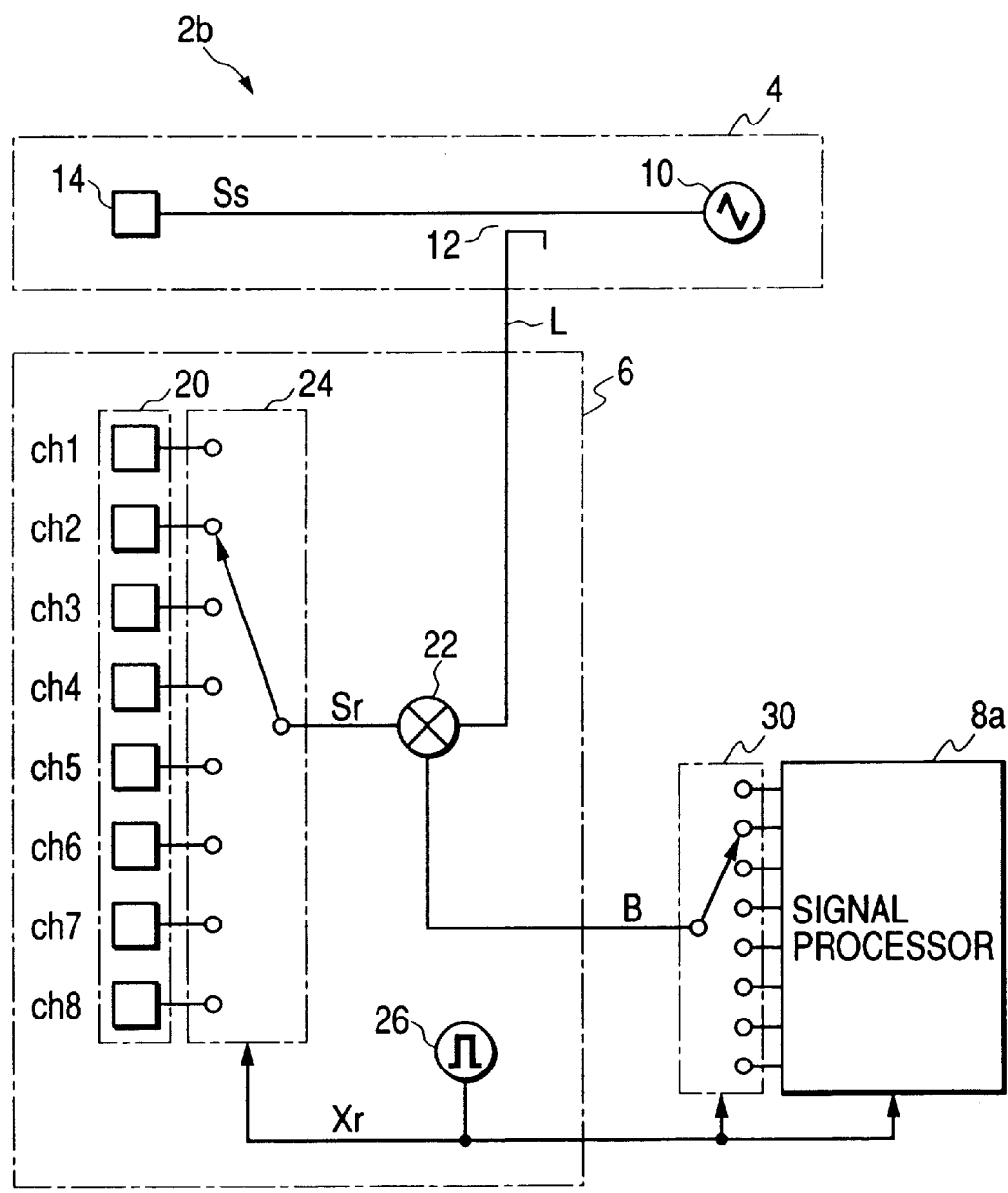
FIG. 9 is a block diagram which shows a radar apparatus according to the third embodiment of the invention.

FIG. 9 shows a radar apparatus 2b of the third embodiment. The same reference numbers as employed in the first embodiment refer to the same parts, and explanation thereof in detail will be omitted here.

The radar apparatus 2b includes a signal processor 8a and a split switch 30. The signal processor 8a has eight beat signal input terminals, one for each of the receiver channels ch1 to ch8. The split switch 30 is responsive to the selection signal Xr to establish communication between the receiving circuit 22 and one of the beat signal input terminals of the signal processor 8a so that the beat signal B may be inputted to the signal processor 8a in synchronism with outputs of the selection signal Xr from the switch driver 26.

The signal processor 8a has A/D converters each connected to one of the beat signal input terminals. Each of the A/D converters is responsive to input of the beat signal B to sample it.

Figure 4B:
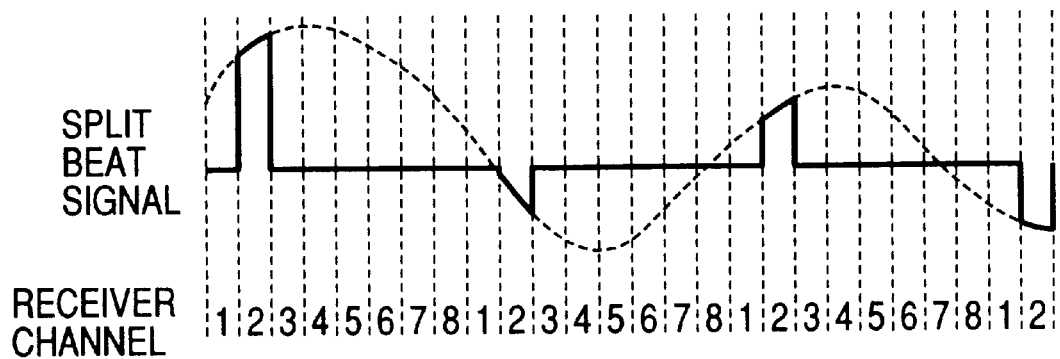
FIG. 4(b) shows a beat signal inputted to a signal processor in the third embodiment of the invention.

In operation, both the switches 24 and 30 operate in synchronism with inputs of the selection signal Xr, so that beat signal components B1 to B8, as shown in FIG. 4(b), split according to the receiver channels ch1 to ch8 are inputted, in sequence, to the signal processor 8a. FIG. 4(b) shows only the beat signal component B2 produced in the receiver channel ch2 for the brevity of illustration.

The above arrangement of this embodiment eliminates the need for step 110 in FIG. 5 in which the sampled beat signal components are split according to the receiver channels ch1 to ch8, thereby decreasing an operation load of the signal processor 8a. Further, each of the A/D converters installed in the signal processor 8a may operate only when the beat signal component is inputted into a corresponding one of the beat signal input terminals, thereby allowing the A/D converters to be implemented by inexpensive parts operating at a rate of one-eighth (⅛) of that in the first embodiment.

Figure 10:
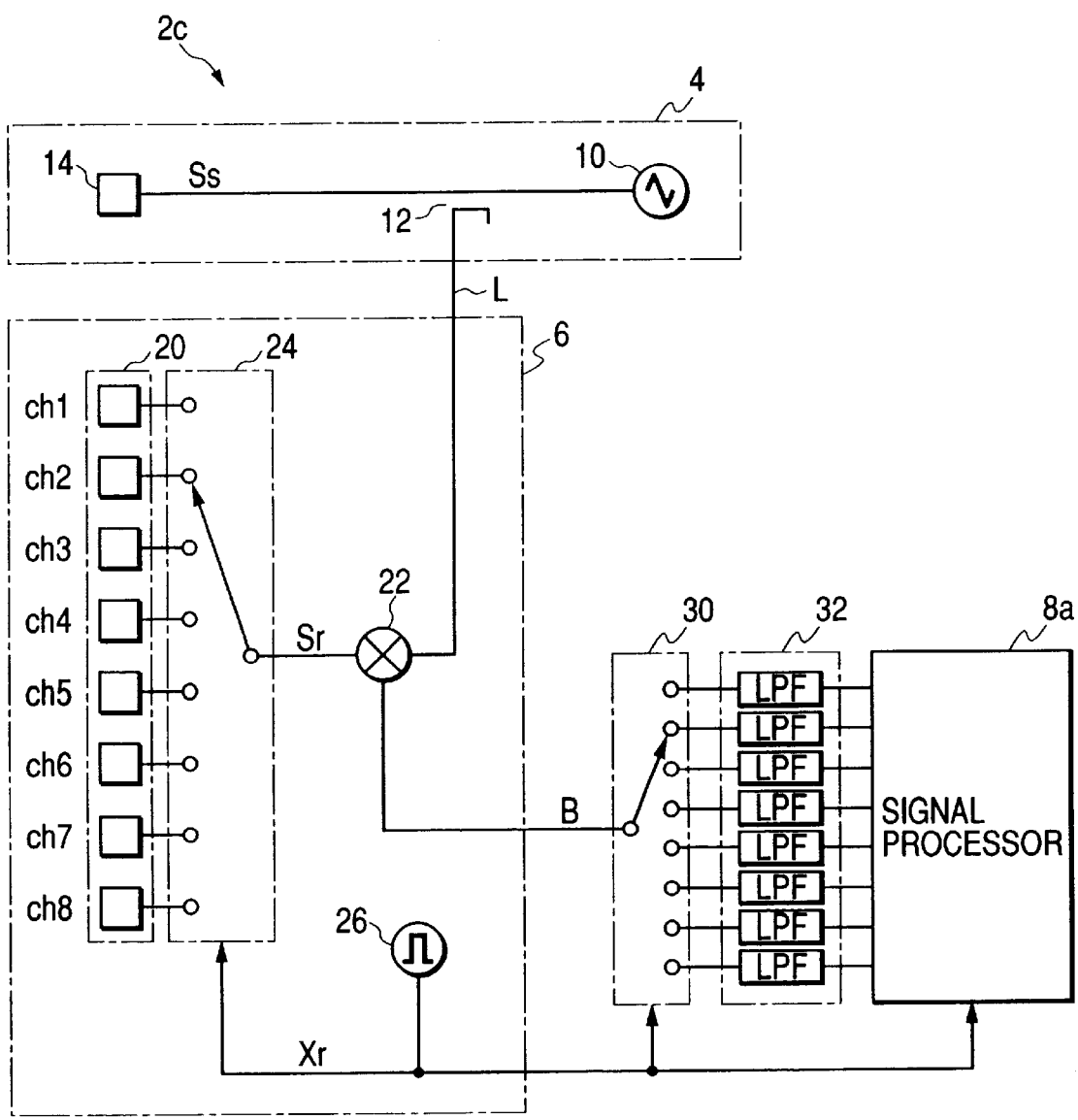
FIG. 10 is a block diagram which shows a modification of the third embodiment.

The outputs from the split switch 30, as shown in FIG. 10, may alternatively be inputted to the signal processor 8a through low-pass filers 32, respectively, to remove noises such as unwanted harmonic components therefrom, thereby avoiding a reduction in detecting sensitivity of the signal processor 8a.

The cutoff frequency of the low-pass filter 32 must be at least lower than an operating frequency (1/td=4 MHz) of the split switch 30. In practice, since the operating frequency is much greater than an upper limit of the beat frequency to be detected, it is advisable that the cutoff frequency be determined depending upon the upper limit of the beat frequency. For instance, if the radar detectable distance R=150 m, and the relative speed V of a target is 0 m/s, then the detected beat frequencies ƒu and ƒb=195 kHz. In this case, it is preferable that the cutoff frequency be set to approximately 200 kHz.

Figure 11:
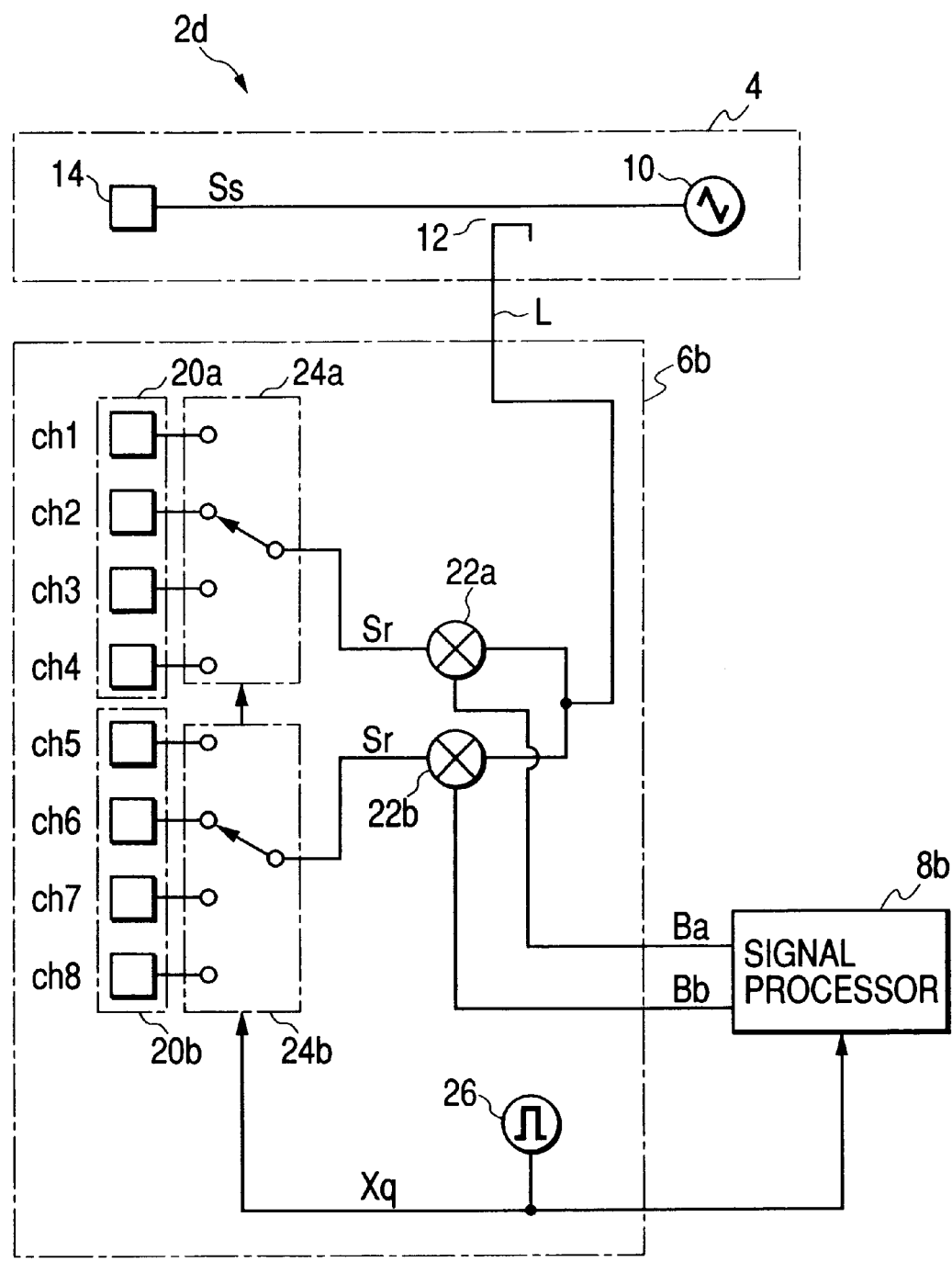
FIG. 11 is a block diagram which shows a radar apparatus according to the fourth embodiment of the invention.

FIG. 11 shows a radar apparatus 2d of the fourth embodiment. The same reference numbers as employed in the first embodiment refer to the same parts, and explanation thereof in detail will be omitted here.

The receiver 6b includes receiving antennas 20a and 20b, a pair of switches 24a and 24b, and a pair of receiving circuits 22a and 22b. The four receiving antennas 20a of the first to fourth channels ch1 to ch4 connect with the receiving circuit 22a through the switch 24a. Similarly, the four receiving antennas 20b of the fifth to eighth channels ch5 to ch8 connect with the receiving circuit 22b through the switch 24b. The receiving circuit 22a mixes the signal Sr outputted from each of the receiving antennas 20a with the local signal L to produce the beat signal Ba. Similarly, the receiving circuit 22b mixes the signal Sr outputted from each of the receiving antennas 20b with the local signal L to produce the beat signal Bb. Each of the switch 24a and 24b is, like the switch 24 in the first embodiment, responsive to input of the selection signal Xq produced by the switch driver 26 to establish communication between each of the receiving antennas 20a and 20b with a corresponding one of the receiving circuits 22a and 22b.

In the following discussion, a combination of the receiving antennas 20a of the receiver channels ch1 to ch4, the switch 24a, and the receiving circuit 22a will be referred to as a first receiver group, and a combination of the receiving antennas 20b of the receiver channels ch5 to ch8, the switch 24b, and the receiving circuit 22b will be referred to as a second receiver group.

The signal processor 8b has two A/D converters which operate simultaneously in synchronism with inputs of the selection signal Xq from the switch driver 26 to sample the beat signals Ba and Bb, respectively, in the same manner as in the first embodiment.

The switch 24a selects one of the receiving antennas 20a in the order of ch1, ch2, ch3, and ch4. Similarly, the switch 24b selects one of the receiving antennas 20b in the order of ch5, ch6, ch7, and ch8. Specifically, the receiver channels ch1, ch2, ch3, and ch4 in the first receiver group are made active together with the receiver channels ch5, ch6, ch7, and ch8, respectively. Therefore, the beat signal Ba formed by time-division multiplexing beat signal components produced in the first receiver group and the beat signal Bb formed by time-division multiplexing beat signal components produced in the second receiver group are inputted to the signal processor 8b.

The operation performed in the signal processor 8b to determine the azimuth of a target is the same as that in the first embodiment except that the phase $\theta i(fb)$ of a frequency component produced in each of the receiver channels ch to ch8 is corrected using the coefficient H1 equal to that used in correcting the phase $\theta i(fb)$ of a frequency component of a corresponding one of the receiver channels ch1 to ch4.

The radar apparatus 2b of the fourth embodiment breaks down the receiver channels ch1 to ch8 into the two receiver groups and has the two receiving circuits 22a and 22b, one for each of the receiver groups. Therefore, sampling as many beat signal components as in the first embodiment in the signal processor 8b allows each of the switch 24a and 24b and the A/D converters installed in the signal processor 8b to operate at a rate of one-half of that in the first embodiment. Conversely, operating each of the switch 24a and 24b and the A/D converters at the same rate as that in the first embodiment allows beat signal components of two times those in the first embodiment to be sampled by the A/D converters.

Figure 12:
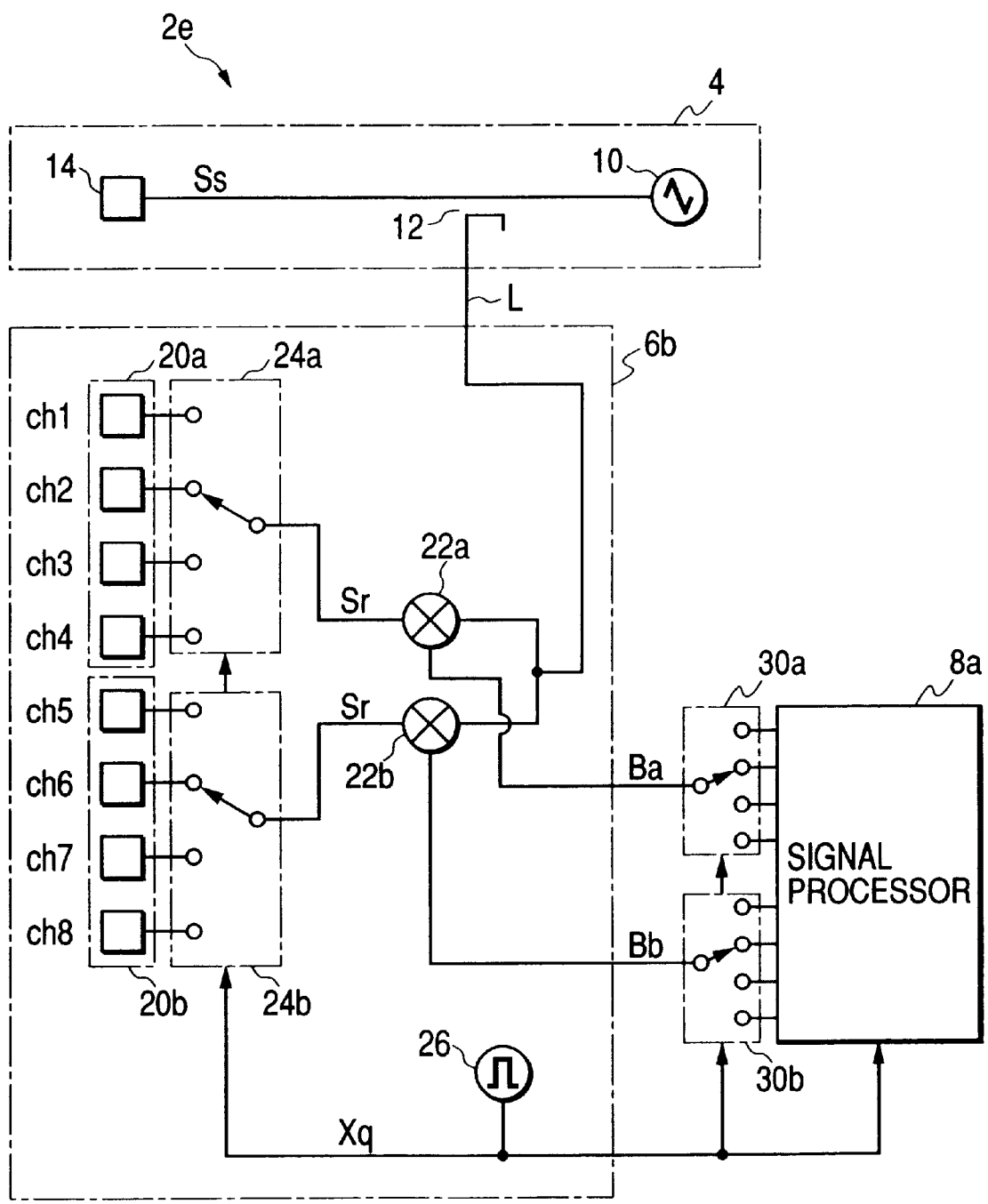
FIG. 12 is a block diagram which shows a modification of the fourth embodiment.

The beat signals Ba and Bb produced in the first and second receiver groups are, as described above, inputted directly to the signal processor 8a, but may be inputted thereto through switches 30a and 30b, as shown in FIG. 12, disposed, one for each of the first and second receiver groups. The switches 30a and 30b are responsive to inputs of the selection signal Xq to operate in the same manner as that in the switch 30 shown in FIG. 9 to split the beat signals Ba and Bb into beat signal components according to the receiver channels ch1 to ch8.

Figure 13:
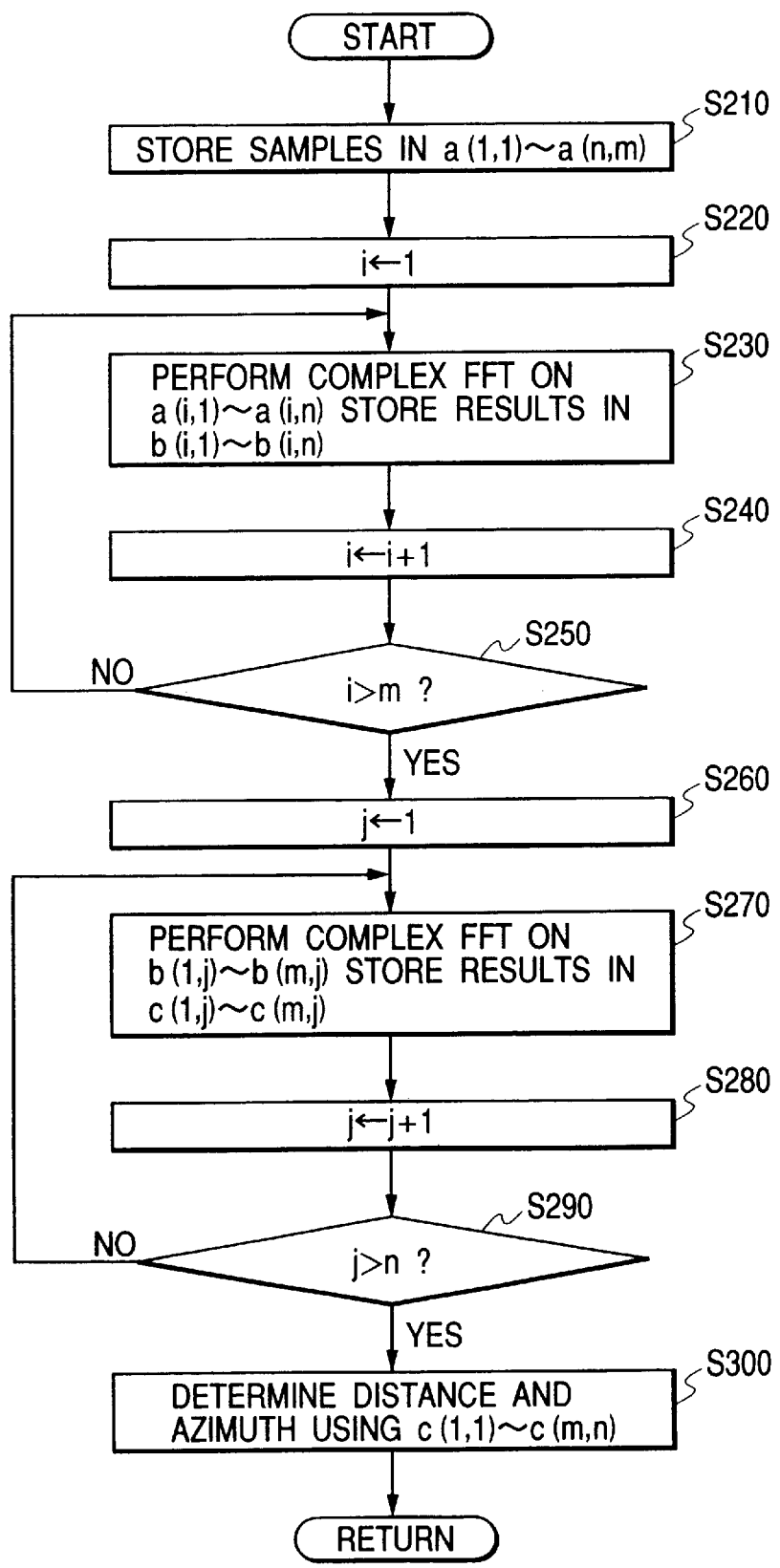
FIG. 13 is a flowchart of a program performed by a signal processor of the fifth embodiment to determine distance to and angular direction of a target.

FIG. 13 shows a flowchart of a program performed by a radar apparatus according to the fifth embodiment. The structure of the radar apparatus of this embodiment is the same as that in the first embodiment, and explanation thereof in detail will be omitted here.

After entering the program, the routine proceeds to step 210 wherein beat signal components B1 to B8 sampled by and stored in the signal processor 8 are grouped according to the receiver channels ch1 to ch8. This is achieved by storing the beat signal components B1 to B8 in a matrix of 8×512 memory locations a(i, n) where i is one of 1 to 8 which correspond the numbers of the receiver channels ch1 to ch8, respectively, and n is one of 1 to 512 (=the number of samplings in each of the channels ch1 to ch8 in the cycle T). For instance, the $99^{th}$ sampled data in the receiver channel ch3 is stored in the memory location a(3, 99).

The routine proceeds to step 220 wherein the parameter i is initialized to one (1). The routine proceeds to step 230 wherein operations of the complex Fast Fourier Transform (FFT) are performed, in time sequence, on the samplings of the first group stored in the memory locations a(1, 1) to a(1, n), and results thereof are stored in a matrix of memory locations b(i,j) (b(1,1) to b(1,n) in the first program cycle) where i is one of 1 to 8 which correspond the numbers of the receiver channels ch1 to ch8, respectively, and j is a parameter corresponding to one of frequencies of the beat signal components. Specifically, in a memory location b(i,j), a complex number is stored which indicates the signal strength (absolute value) and phase (phase angle) of one of frequency components, as specified by j, of a beat signal Bi produced in the receiver channel chi.

The routine proceeds to step 240 wherein the parameter i is incremented by one. The routine proceeds to step 250 wherein it is determined whether the parameter i is greater than the number m of the receiver channels ch1 to ch8 or not. If a NO answer is obtained, then the routine returns back to step 230 wherein the operations of the complex FFT are performed on the sampled data of the subsequent group (the second group stored in the memory locations a(2, 1) to a(2, n) in the second program cycle), and results thereof are stored in the memory locations b(2, 1) to b(2, n). Alternatively, if a YES answer is obtained meaning that the operations of the complex FFT have been completed on all the eight groups, then the routine proceeds to step 260 wherein the parameter j is initialized to one (1). The routine proceeds to step 270 wherein the operations of the complex FFT are performed on the data stored in the memory locations b(i,j) (j=1 in the first program cycle), and results thereof are stored in a matrix of memory locations c(i, j) where i=1 to 8 which represents the so-called spatial frequencies corresponding to m types of digital beams determined by the center-to-center interval dw of the antennas 20 and the frequency of a radar wave, and j=1 to 512 which correspond to, like b(i,j) the frequencies. Specifically, in a memory location c(i,j), a complex number is stored which indicates the signal strength (absolute value) and the phase (phase angle) of a frequency component, as specified by j, of a return of a radar wave traveling from an angular direction, as specified by i.

The routine proceeds to step 280 wherein the parameter j is incremented by one. The routine proceeds to step 290 wherein it is determined whether the parameter j is greater than n or not. If a NO answer is obtained, then the routine returns back to step 270 wherein the operations of the complex FFT are performed on the frequency components of the next group stored in the memory locations b(i, j) (j=2 in the second program cycle). Alternatively, if a NO answer is obtained in step 290, then the routine proceeds to step 300 wherein one or some of the data stored in the memory locations c(1, 1) to c(n, m) having the greatest or greater signal strengths are selected, and the frequency or frequencies, as specified by the parameter j of the memory location(s) c(i, j) in which the selected data is or are stored are found to determine the distance to the target in a known manner. Additionally, the azimuth of the target is also determined based on the signal strength, the phase, and the parameter i as specified by the selected data.

By the complex FFT in step 270, the so-called digital beams are formed. By the complex FFT in time domain (i.e., step 230) and in space domain (i.e., step 270), frequency components of the received signals Sr are analyzed in units of the digital beams, thereby allowing the signal strength and phase of the frequency components to be determined in units of the digital beams. This results in simplicity of the operation of the signal processor 8 to determine the distance to and azimuth of the target, thereby decreasing an operation load on the signal processor. Setting the number of the receiving antennas 20 and the number of samples in each of the receiver channels chi to two (2) to the nth power (n=an integer) and use of the fast Fourier Transform allows the operation of the signal processor 8 to be carried out at higher speed.

The program in FIG. 13 may also be performed in any of the first to fourth embodiments.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

For example, the above embodiments are, as already described, designed to produce a single beat signal in each of the receiver channels chi and supplies it to the signal processor 8. In carrying out the complex FFT, the signal processor 8 performs an orthogonal transformation to decompose the beat signal into real and imaginary components. The real and imaginary components decomposed by the orthogonal transformation may alternatively be multiplexed through the receiver switch and supplied to the signal processor 8.

Figure 14A:
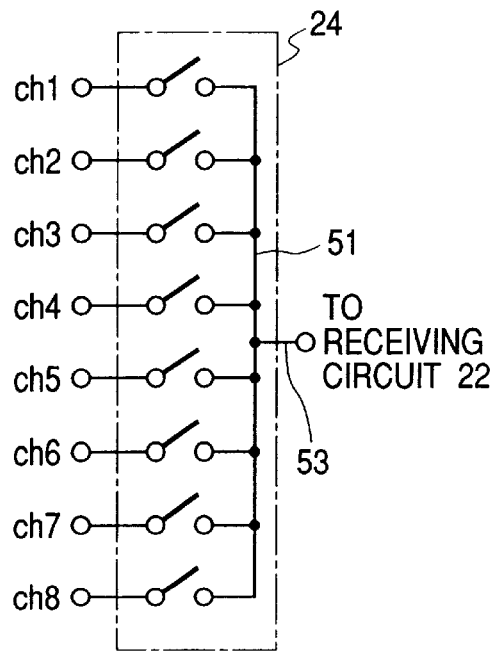
FIG. 14(a) shows an example of a structure of a receiver switch.

The receiver switch 24 may be implemented by a structure, as shown in FIG. 14(a), which consists of high-frequency switches having input terminals each connecting with one of the receiver channels and output terminals all connecting with a common line 51 leading to the receiver circuit 22 through a single line 53. The high-frequency switches may be made of a PIN diode or a transistor which is typically used in on-off control of a micro wave or a millimeter wave. It is advisable that the line 53 be joined to the center of the common line 51, i.e., between the receiving antennas 20 of the receiver channels ch4 and ch5. Specifically, as a portion of the common line 51 is connected closer to the center thereof, a maximum length of a path between the receiving antenna ch1 or ch8 and the receiving circuit 22 becomes shorter, thus resulting in a decrease in propagation loss. This causes, as shown in FIG. 14(c), the received signals Sr picked up from the center of the switch 24, that is, from the receiving antennas 20 of the receiving channels ch4 and ch5 to have the greatest signal strength. Samples of the beat signal B produced by the received signals Sr picked up in such a manner have the same values as those multiplexed by a window function performed typically in the Fourier Transform, thus resulting in a decrease in operation load on the signal processor 8.

Figure 14B:
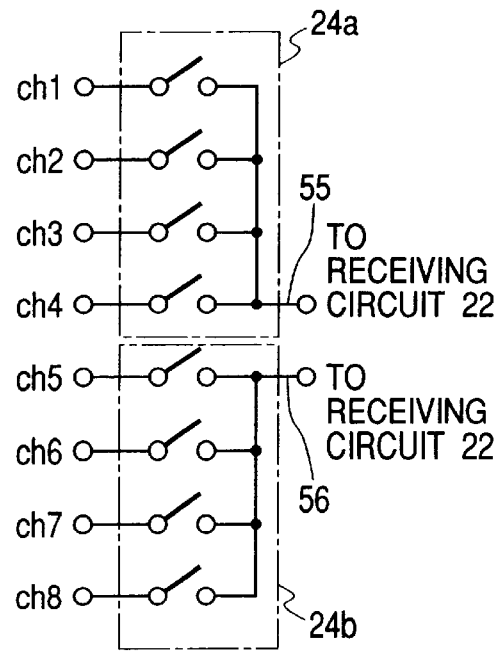
FIG. 14(b) shows an example of a structure of receiver switches in the fourth embodiment.
Figure 14C:
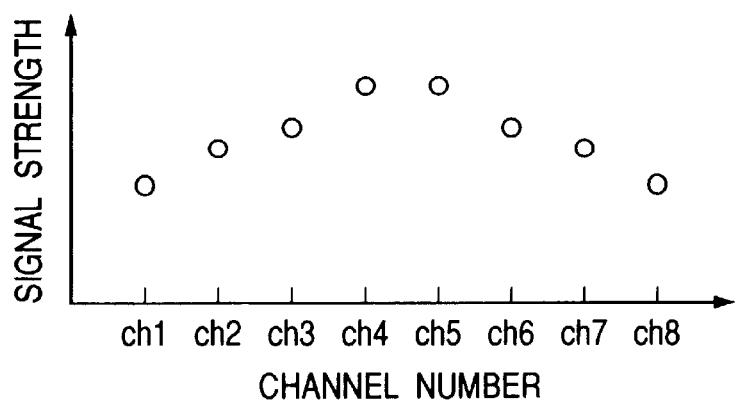
FIG. 14(c) shows strength of signals outputted from the receiver switch or switches in FIG. 14(a) or 14(b)

In the case of the fourth embodiment shown in FIG. 11, the high-frequency switches are, as shown in FIG. 14(b), split into two switch units 24a and 24b. Adjacent two of the high-frequency switches in the switch units 24a and 24b are connected to the receiving circuit 22a and 22b through signal lines 55 and 56, respectively, thereby establishing substantially the same signal strength distribution as shown in FIG. 14(c).

What is claimed is:

1. A radar apparatus comprising:
   a transmitter producing a transmit signal which is so modulated in frequency as to change with time cyclically and transmitting the transmit signal as a radar wave;
   a plurality of receiving antennas each receiving a return of the radar wave from an object present in a radar detectable zone to produce an input signal;
   a receiver including a receiver switch, a switching control circuit, and a receiving circuit, the receiver switch selectively establishing communication between one of said receiving antennas and the receiving circuit, the switching control circuit controlling an operation of the receiver switch so as to change the communications between said receiving antennas and the receiving circuit in sequence in a cycle shorter than a cycle of a change in the frequency of the transmit signal to supply a series of signal components of the input signals produced by said receiving antennas to the receiving circuit, the receiving circuit mixing the series of signal components with a local signal having the same frequency as that of the transmit signal to produce a beat signal; and
   a signal processor sampling the beat signal produced by said receiver to analyze frequency components of the beat signal.

2. A radar apparatus as set forth in claim 1, wherein each of said receiving antennas has directivity that causes a return of the radar wave traveling from any angular direction over a beam range of the radar wave to be received.

3. A radar apparatus as set forth in claim 1, wherein said receiving antennas are arrayed in line.

4. A radar apparatus as set forth in claim 3, wherein a center-to-center interval dw of adjacent two of said receiving antennas is so set as to satisfy an equation below $$dw \leq \lambda / \{2 \sin (\phi/2)\}$$

where $\lambda$ is the mean wavelength of said transmit signal, and $\phi$ is a beam width of the radar wave emitted from said transmitter.

5. A radar apparatus as set forth in claim 4, wherein each time said receiver switch selectively establishes the communications between all said receiving antennas and said receiving circuit one time for each of said receiving antennas, said switching control circuit changes the order of establishing the communications.

6. A radar apparatus as set forth in claim 5, wherein said signal processor includes, (1) beat signal reproducing means for reproducing as many second beat signals as said receiving antennas each of which is made up of the signal components of a corresponding one of the input signals, (2) distance information determining means for determining information about a distance to the object by performing frequency analysis of each of the second beat signals to determine a signal strength and phase of each of resultant frequency components to determine the information based on the signal strengths, and (3) angular direction information determining means for determining information about an angular direction of the object by comparing between the phases of ones of the frequency components, determined by said distance information determining means, which have the same frequency.

7. A radar apparatus as set forth in claim 6, wherein said beat signal reproducing means includes sampling means for sampling the beat signal supplied from said receiving circuit in synchronism with the operation of the receiver switch and grouping means for grouping samplings according to the input signals to produce the second beat signals.

8. A radar apparatus as set forth in claim 6, wherein said beat signal reproducing means includes a splitting switch which splits the beat signal supplied from said receiving circuit in synchronism with the operation of said receiver switch into as many signals as said receiving antennas each of which includes one of the input signals produced by said receiving antennas to produce the second beat signals and sampling means for sampling the second beat signals to analyze frequency components thereof.

9. A radar apparatus as set forth in claim 6, wherein said beat signal reproducing means includes, (1) a splitting switch which splits the beat signal supplied from said receiving circuit in synchronism with the operation of said receiver switch into as many signals as said receiving antennas each of which includes one of the input signals produced by said receiving antennas to produce the second beat signals, (2) as many low-pass filters as the split signals whose cutoff frequency is lower than a switching frequency of said splitting switch and which remove harmonic components from the split signals caused by an operation of said splitting switch, and (3) sampling means for sampling outputs from said low-pass filter for analyze frequency components thereof.

10. A radar apparatus as set forth in claim 6, further comprising phase compensating means for compensating for a shift in the phase $\theta i(fb)$ of each of the frequency components having a frequency $fb$ determined by said distance information determining means, caused by differences in time when said receiving antennas are selected by said receiver switch, by multiplying the phase $\theta i(fb)$ by a compensating coefficient H1 given by an equation below $$H1 = \exp\{-j \cdot 2\pi \cdot fb \cdot (ti-t1)\}$$

where j is an imaginary unit, i is one of numbers (=1,2, ..., n) assigned to said receiving antennas, respectively, and ti is a time when one of said receiving antennas to which the number i is assigned is selected by said receiver switch, and wherein said angular direction information determining means determines the information about the angular direction of the object using the phases compensated for by said phase compensating means.

11. A radar apparatus as set forth in claim 10, wherein said phase compensating means further compensates for a shift in the phase $\theta i(fb)$ caused by differences in path from said receiving antennas to said receiving circuit by multiplying a product of the phase $\theta i(fb)$ and the compensating coefficient H1 by a second compensating coefficient H2 given by an equation below $$H2 = \exp\{-j \cdot \delta i\}$$

where $\delta i$ is a phase delay of the input signal, produced by one of said receiving antennas to which the number i is assigned, between the one of said receiving antennas and said receiving circuit.

12. A radar apparatus as set forth in claim 6, wherein the frequency analysis in said distance information determining means and the comparing between the phases in said angular direction information determining means are performed using a complex Fourier Transform.

13. A radar apparatus as set forth in claim 12, wherein said receiving antennas are arrayed in line and connected to said receiving circuit so that propagation losses of the input signals produced by ones of said receiving antennas located closer to the center of the array of said receiving antenna may be smaller.

14. A radar apparatus as set forth in claim 1, wherein said transmitter includes, (1) a transmitting circuit producing the transmit signal, (2) a plurality of transmitting antennas which convert the transmit signal into radar waves and emit the radar waves in different directions, (3) a transmitter switch selectively establishing communication between one of said transmitting antennas and said transmitting circuit to supply the transmit signal to the one of said transmitting antennas, and (4) a switching control circuit changing the communications between said transmitting antennas and said transmitting circuit every cycle of the change in the frequency of the transmit signal.

15. A radar apparatus comprising:

a transmitter producing a transmit signal which is so modulated in frequency as to change with time cyclically and transmitting the transmit signal as a radar wave;

a plurality of antenna groups each consisting of a plurality of antennas each receiving a return of the radar wave from an object present in a radar detectable zone to produce an input signal;

a receiver including receiver switches, a switching control circuit, and receiving circuits, each of the receiver switches selectively establishing communication between one of said receiving antennas in one of said antenna groups and one of the receiving circuits, the switching control circuit controlling operations of the receiver switches so as to change the communications between said receiving antennas and the receiving circuits in sequence in a cycle shorter than a cycle of a change in the frequency of the transmit signal to supply a plurality of series of signal components of the input signals each of which is produced by said receiving antennas in a corresponding one of said antenna groups to the receiving circuit, each of the receiving circuits mixing a corresponding one of the series of signal components with a local signal having the same frequency as that of the transmit signal to produce a beat signal; and a signal processor sampling the beat signals produced by said receiver to analyze frequency components of the beat signals.

* * * * *